(12) United States Patent
Cui (10) Patent No.: US 10,377,608 B2
(45) Date of Patent: *Aug. 13, 2019

(54) WINCH FOR VEHICLES

(71) Applicant: Ningbo Lianda Winch Co., Ltd., Ningbo (CN)

(72) Inventor: Xiaojun Cui, Ningbo (CN)

(73) Assignee: Ningbo Lianda Winch Co., Ltd., Ningbo (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/815,151

(22) Filed: Nov. 16, 2017

(65) Prior Publication Data

US 2019/0092608 A1  Mar. 28, 2019

(30) Foreign Application Priority Data

Sep. 22, 2017 (CN) .......................... 2017 1 0863093

(51) Int. Cl.
*B66D 1/12* (2006.01)
*B60D 1/18* (2006.01)
*B66D 1/00* (2006.01)
*B66D 1/22* (2006.01)

(52) U.S. Cl.
CPC .............. *B66D 1/12* (2013.01); *B60D 1/185* (2013.01); *B66D 1/00* (2013.01); *B66D 1/225* (2013.01); *B66D 1/22* (2013.01)

(58) Field of Classification Search
CPC ... B66D 1/12; B66D 1/00; B66D 1/14; B66D 1/22; B66D 1/185; B66D 1/225; B66D 3/20; B66D 5/00; B60D 1/185
See application file for complete search history.

(56) References Cited

U.S. PATENT DOCUMENTS

| | | | | |
|---|---|---|---|---|
| 2,583,140 A * | 1/1952 | Else | .......................... | B66D 1/12 188/166 |
| 4,227,680 A * | 10/1980 | Hrescak | .................. | B66D 1/22 254/344 |
| 5,663,541 A * | 9/1997 | McGregor, II | ........... | H01H 1/20 200/17 R |
| 7,922,153 B2 * | 4/2011 | Zhou | ........................ | B66D 1/22 254/323 |
| D660,254 S * | 5/2012 | Cui | ............................... | D13/159 |
| 8,434,742 B2 * | 5/2013 | Akhavein | .............. | B66D 3/006 254/344 |
| D811,685 S * | 2/2018 | Fretz | ............................... | D34/33 |
| 9,902,597 B2 * | 2/2018 | Huang | ..................... | B66D 1/14 |
| 9,908,752 B2 * | 3/2018 | Huang | ..................... | B66D 1/14 |

(Continued)

*Primary Examiner* — Michael E Gallion

(74) *Attorney, Agent, or Firm* — Gokalp Bayramoglu (57) ABSTRACT

The present disclosure discloses a winch for vehicles comprising a motor, a motor casing covering at least a part of the motor, a driving shaft drivably connected to the motor, a gear reduction drivably connected to the driving shaft, a first support frame detachably connected to the motor casing, a second support frame detachably connected to the gear reduction unit, and a winding drum arranged between the first support frame and the second support frame. The first support frame comprises a plurality of gripping components which extend from the first support frame to the motor casing and surround an outer surface of the motor casing. The winch as disclosed facilitates mounting and dismounting, and provides improved waterproofness.

8 Claims, 8 Drawing Sheets

(56) References Cited

U.S. PATENT DOCUMENTS

| | | | |
|---|---|---|---|
| 2007/0221898 A1* | 9/2007 | Giacomini | B66D 1/08 254/323 |
| 2008/0000735 A1* | 1/2008 | Huang | B60T 13/02 188/171 |
| 2008/0224110 A1* | 9/2008 | Starks | B66D 3/20 254/264 |
| 2011/0180770 A1* | 7/2011 | Karambelas | B66D 1/12 254/344 |
| 2014/0001427 A1* | 1/2014 | Fretz | B66D 1/02 254/342 |
| 2016/0159626 A1* | 6/2016 | Hartmann | B66D 1/12 254/344 |

* cited by examiner

WINCH FOR VEHICLES

CROSS-REFERENCE TO RELATED APPLICATIONS

This application claims priority to Chinese Patent Application No. 201710863093.4 with a filing date of Sep. 22, 2017. The content of the aforementioned applications, including any intervening amendments thereto, are incorporated herein by reference.

TECHNICAL FIELD

The present disclosure relates to the field of vehicle accessories, and more particularly, to a winch for vehicles.

BACKGROUND OF THE PRESENT INVENTION

Winches are devices used for traction, and are mainly used to rescue vehicles in harsh environments. When the vehicle is trapped in muddy or rough terrain and not the wheels are on the ground, the winch can be used to drag the vehicle out by using another object as a fulcrum. The winch can also be used to drag large-size obstacles such as logs. Existing electrical winches are mainly comprised of a motor, a driving shaft, a gear reduction box and a winding drum. The gear reduction box transmits the driving power from the motor to the winding drum so that a substantial traction force can be induced on a steel wire wound around the winding drum for functions of the winch.

Winches are mainly prepared for emergencies so they have to work under various hostile environments. Unexpected failures may frequently happen during use of winches. The structures of existing winches need improvement in ease of maintenance and operation to deal with unexpected failures rapidly. Besides, mechanical components of a winch are subject to water damage in water or rainy weather. It is still desirable to design a winch with improved sealing performance, more compact structures, easier assembly and favorable visual appearances.

SUMMARY OF PRESENT INVENTION

The present disclosure discloses a winch for vehicles comprising a motor, a motor casing covering at least a part of the motor, a driving shaft drivably connected to the motor, a gear reduction drivably connected to the driving shaft, a first support frame detachably connected to the motor casing, a second support frame detachably connected to the gear reduction unit, and a winding drum arranged between the first support frame and the second support frame. The first support frame comprises a plurality of gripping components which extend from the first support frame to the motor casing and surround an outer surface of the motor casing.

According to some embodiments, the first support frame comprises a mounting groove for mounting a first sealing ring and a mounting pedestal surrounded by the mounting groove for mounting a second sealing ring.

According to some embodiments, each gripping components comprises a threaded hole, and the gripping components are screwed to the motor casing by a plurality of hexagon bolts.

According to some embodiments, a via for the driving shaft is arranged at the center of symmetry of the gripping components, and a brake component is installed within the via.

According to some embodiments, the brake component comprises a first torsion spring and a second torsion spring intertwined with each other.

According to some embodiments, the winch further comprises a control unit supported by the first and second support frames.

According to some embodiments, the motor casing comprises a plurality of conducting columns electrically coupled to the motor and the control unit, and the plurality of conducting columns protrude from the motor casing.

According to some embodiments, four protruding support component are arranged in the interior of the motor casing to contact and support a coil casing.

According to some embodiments, the plurality of gripping components comprises four gripping parts.

According to some embodiments, two adjacent gripping components are symmetrically located with respect to one support component arranged on a portion of the motor casing between the two adjacent gripping portions.

The embodiments as disclosed solve/alleviate at least one problem of the prior arts. The more compact structure of the winch provides expedient dismounting and mounting for the user. Waterproofness of the winch is also enhanced by providing the gripping components outside the motor casing.

DESCRIPTION OF THE DRAWINGS

The present invention is illustrated by way of example and not limitation in the figures of the accompanying drawings, in which like references indicate similar elements, and in which.

DETAILED DESCRIPTION OF PREFERRED EMBODIMENTS

Various aspects of the illustrative embodiments will be described using terms used by those commonly skilled in the art to convey the substance of their work to other. However, it will be apparent to the skilled in the art that alternate embodiments may be practices with only some of the described aspects. For purposes of explanation, specific number, materials, and configurations are set forth in order to provide a thorough understanding of the illustrative embodiments. However, it will be apparent to one skilled in the art that alternate embodiments may be practices without the specific details. In other instances, well-known features are omitted or simplified in order not to obscure the illustrative embodiments.

Although the terms first, second, third, left, right, upper, lower, etc. may be used herein to describe various elements, these elements should not be limited by these terms. These terms are only used to distinguish one element from another. Terms such as "first," "second," and other numerical terms when used herein do not imply a sequence or order unless clearly indicated by the context. Thus, a first element could be termed a second element, and a left component could be termed a right component without departing from the teachings of the example embodiments. In addition, the term "and/or" may mean "and", "or", "exclusive-or", "one", "some, but not all", "neither", or "both", although the scope of the claimed subject matter is not limited in this respect. In the following description and/or claims, the terms "comprise" and "include", along with their derivative, may be used and are intended as synonyms for each other.

The terms used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof. Furthermore, in the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements.

Figure 1:
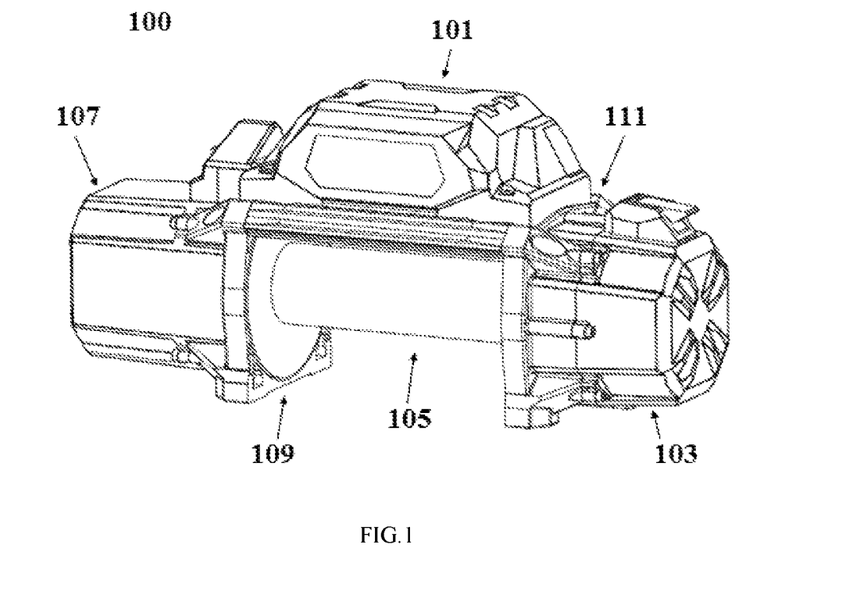
FIG. 1 is a schematic diagram of a winch according to an embodiment.

FIG. 1 is a schematic drawing of a winch 100 according to an embodiment of the present disclosure. The winch 100 comprises a control unit 101 to allow user manipulation of various functions of the winch. The control unit 101 is electrically coupled to other components. The control unit 101 may also provide power supply to the winch 100. The control unit 101 could be installed on top of the winch 100 and supported by the first support frame 109 and the second support frame 111. The shapes of the first support frame 109 and the second support frame 111 can be adapted to the control unit 101. The winch 100 further comprises a motor unit 107 to provide power, a winding drum 105 driven by the motor unit 107, and a gear reduction unit 103 to adjust the rotating speed of the winding drum 105. The winding drum 105 is rotatably connected to the motor unit 107 and the gear reduction unit 103 by a driving shaft 317. Cables used to drag the vehicle are wound around the winding drum 105. A first cavity to receive the motor is formed by detachably connecting the motor unit 107 and the first support frame 109. The gear reduction unit 103 and the second support frame 111 are detachably connected to form a second cavity to receive gear reduction mechanisms. The winding drum 105 is arranged between the first support frame 109 and the second support frame 111. The winch 100 can be mounted to the vehicle by the first support frame 109 and the second support frame 111. The cables wound on the winding drum 105 rotate with the winding drum 105. The gear reduction unit 103 comprises a multi-stage planetary wheel component for speed reduction in order to control the rotating speed of the winding drum 105. Multiple work modes, such as a disengaged mode, a high speed mode, and a low speed mode, can be provided.

Figure 2:
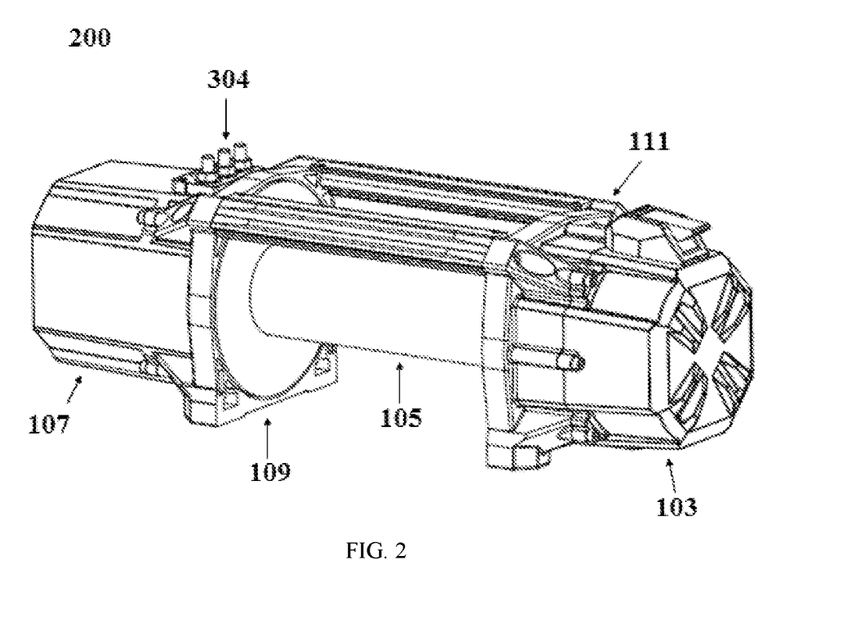
FIG. 2 is a schematic diagram of a winch according to another embodiment.

FIG. 2 shows a winch 200 according to another embodiment of the present disclosure. The difference between the winch 200 and the winch 100 is that the winch 200 comprises no control unit 101. A peripheral control unit 101 can be provided for the winch 200 to allow user customization of control means. In some embodiments, the control unit 101 can be removed from the winch 200 and placed in other locations far away from the winch 200, including the interior or bottom of the vehicle, so that damage to the control unit 101 can be avoided. The winch 200 comprises a plurality of conducting columns 304 to electrically couple to a peripheral or remote control unit 101. Although only three conducting columns 304 are shown, the skilled in the art would anticipate more or less conducting columns 304 are possible.

Figure 3:
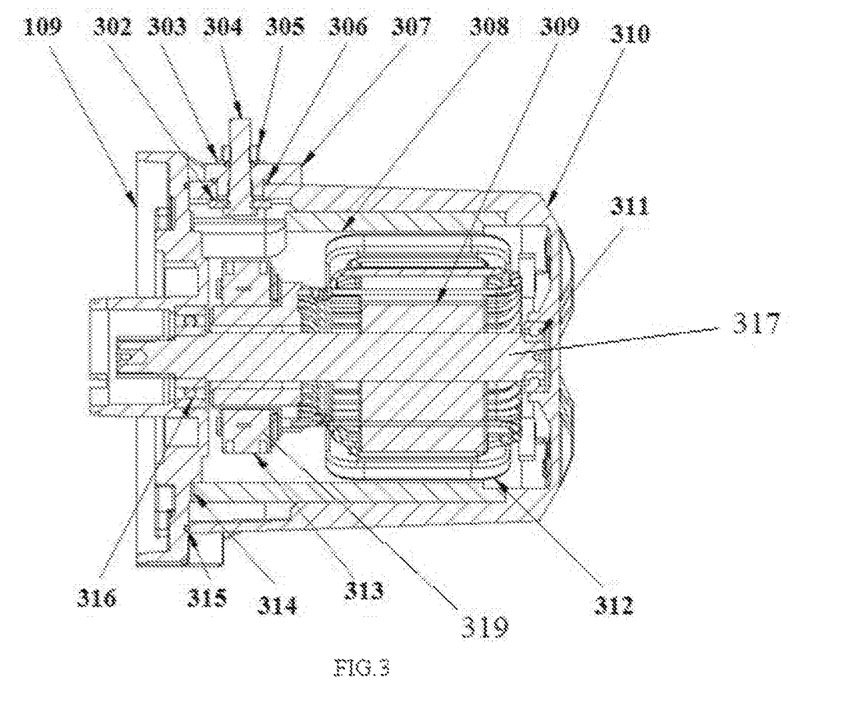
FIG. 3 is a cross-section of a motor of a winch according to an embodiment.
Figure 4:
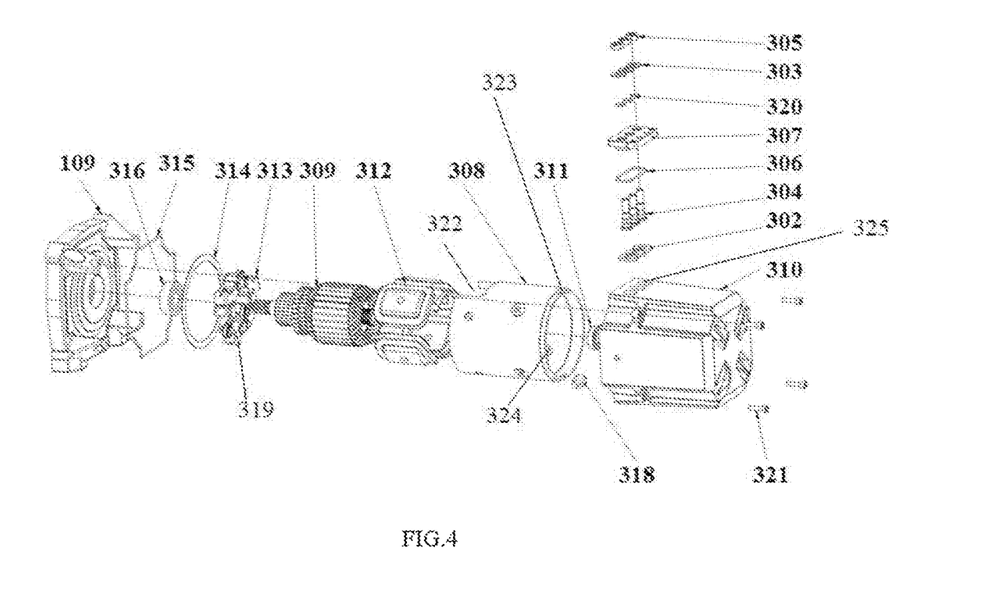
FIG. 4 is an explosive view of a motor of a winch according to an embodiment.

FIGS. 3 and 4 show the motor unit 107. The motor unit 107 comprises a motor casing 310 detachably connected to the first support frame 109. For example, the motor casing 310 can be connected to the first support frame 109 by a plurality of hexagon nuts 321 to form a first cavity to accommodate other components of the motor unit 107. The motor unit 107 has a motor comprising a rotator 309, a brush holder assembly 319 electrically coupled to the rotator 309, and a coil assembly surrounding the rotator 309. The rotator 309 is rotatably mounted in the first cavity by a first bearing component 311 and a second bearing component 316. The rotator 309 can be any existing armatures which produce electromagnetic force with DC or AC current. For example, the first bearing component 311 can be a 6001 type bearing, and the second bearing component 316 can be a 6203 type bearing. The brush holder 313 comprises a plurality of brushes in contact with the rotator 309. Each brush is slidably coupled to the rotator 309 to provide a conductive connection. The brush can be any of a graphite brush, an electrochemical graphite brush, a resin bonded graphite brush, and a metallic graphite brush. Optionally, a first motor end sealing ring 314 and a second motor end sealing ring 315 can be provided at positions where the motor casing 310 and the first support frame 109 make contact. Using two sealing rings can further enhance waterproof capabilities. The coil assembly comprises a flux coil 312 and a coil casing 308. The flux coil 312 is mounted to the coil casing 308 by a plurality of inner hexagon bolts 318. The coil assembly surrounds the rotator 309, and the brush holder assembly 319 is located on one side of the coil assembly. The brush holder assembly 319 is placed on the side which is nearer to the first support frame 109 and is at a distance from the first support frame 109. A notch 322 is provided on the edge of the end of coil casing which is nearer to the brush holder assembly 319. The size of the notch 322 is adapted to allow the conducting columns 304 to pass through to electrically couple with brush holder 313 and the flux coil 312. Further, the notch 322 can be used for heat dissipation and therefore, facilitates manual dismounting and mounting of the coil casing 308. At least one cut 323 is provided on the edge of the other end of the coil casing 308 which is opposite to the end which has the notch 322 and is near the brush holder assembly 319. The at least one cut 323 is formed on a step component 324 protruding into the interior of the motor casing 310, i.e., protruding towards a direction leading away from the first support frame 109. The shape of the at least one cut 323 is adapted to support structures within the motor casing so as to mount within the motor casing 310. In the embodiment where the coil casing 308 is cylindrical, the diameter of a circle defined by the step component 324 is less than the diameter of a circle defined by the cross-section of the coil casing 308. The end of the coil casing 308 having the notch 322 is in contact with the first support frame 109, while the end of the coil casing 308 having the step component 324 is in contact with, the bottom of the motor casing 310. The coil casing 308 therefore surrounds the brush holder 313, the rotator 309, and the flux coil 312, and provides protection such as waterproofness and shock absorption for these components.

A plurality of conducting columns 304 coupled to the control unit are arranged on positions above the motor casing 310 in correspondence with the brush holder 313. The upper portions of the conducting columns 304 protrude from mounting holes 325 opened on the motor casing 310. The lower portions of the conducting columns 304 are in contact with the plastic covers 302 and the insulating bracket 307, so that the conducting columns 304 are insulated from the motor casing 310. A sealing ring 306 is arranged at a position where the insulating bracket 307 contacts with the motor casing 310. A plurality of O-rings 320 and gaskets 303 surrounding the conducting columns 304 are deployed on the insulating bracket 307. The gaskets 303, the sealing rings 306 and the O-rings 320 are all used to provide sealing. The conducting column nuts 305 are used to fix the conducting columns 304 onto the motor casing 310. The conducting columns 304 are for example using conduct wires to electrically couple to the control unit 101 which is within the winch 100 or remote from the winch 200. In another aspect, the conducting columns 304 are electrically coupled to the coil assembly and the brush holder assembly 319 to control their operation and/or connect them to a power source. At least one conducting column 304 is electrically coupled to the brush holder 313, and therefore coupled to the rotator 309. At least one conducting column 304 is coupled to the flux coil 312 to produce electromagnetic fields. Optionally, one conducting column 304 is connected to the brush holder 313 and two conducting columns 304 are connected to the flux coil 312.

The interface between the first support frame 109 and the motor casing 310 is likely to have gaps which are subject to water inflow. Deploying the conducting columns 304 on the motor casing 310 provides better sealing performances for the connection between the first support frame 109 and the motor casing 310. Sealing mechanisms such as the gasket 303, the sealing rings 306, the O-rings 320, and the motor end sealing rings 314, 315 can further enhance the waterproofness of the winch 100, 200. Besides, deploying the conducting column 304 on the motor casing 310 reduces the size of the first support frame to provide a more concise structure of the winch 100, 200.

Figure 5:
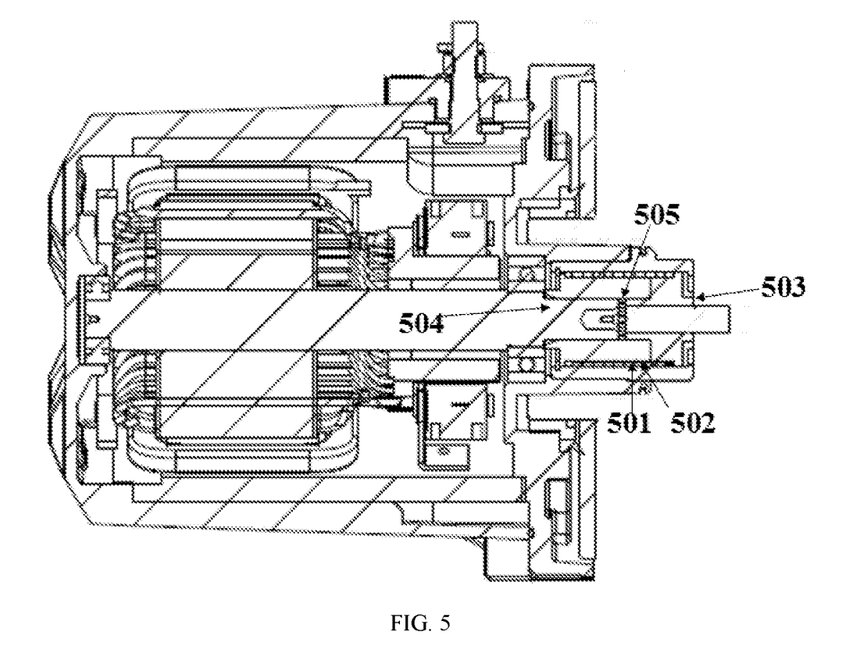
FIG. 5 is a brake component of a winch according to an embodiment.

FIG. 5 shows a brake component according to an embodiment. The brake component a3 comprises a first torsion spring 501 and a second torsion spring 502 intertwined with each other to avoid sudden reverse rotations of the winch. The first torsion spring 501 and the second torsion spring 502 are oriented in the same direction. Optionally, the first torsion spring 501 and the second torsion spring 502 contain the same number of turns. The brake component further comprises a spline to transmit the torque. The spline 505 can be a rectangular spline or an involute spline. The two ends of the brake component comprise a first opening 503 and a second opening 504 to allow the driving shaft 317 to pass through. The spline 505 may be located at the first opening 503, the second opening 504, or a place between the first opening 503 and the second opening 504. The first opening 503 and the second opening 504 can be formed as threaded holes.

Figure 6:
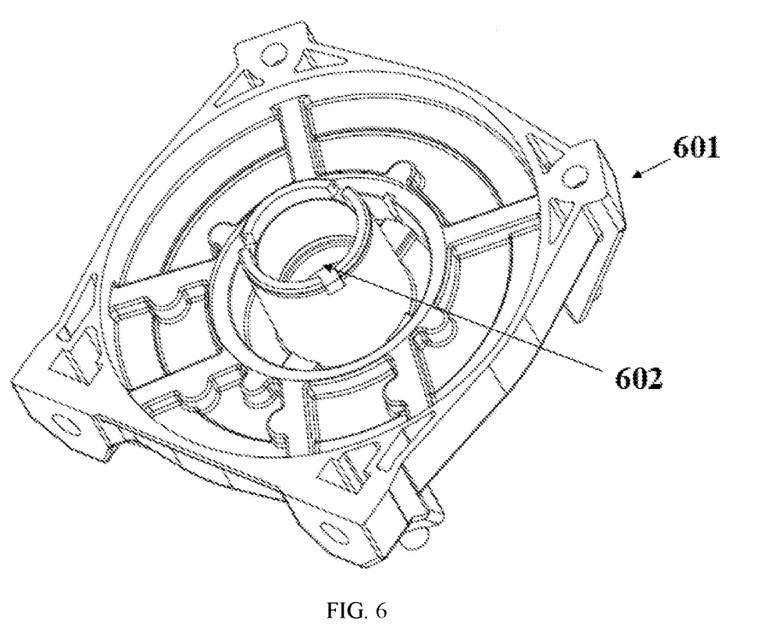
FIG. 6 is a schematic diagram of a first support frame of a winch according to an embodiment.
Figure 7:
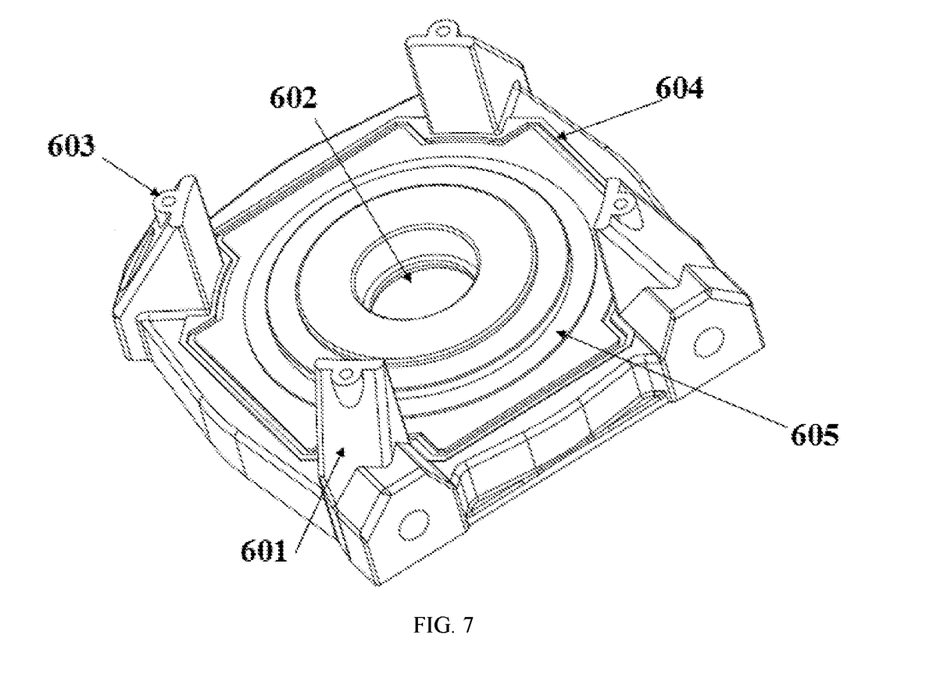
FIG. 7 is a schematic diagram of a first support frame of a winch according to an embodiment.

FIGS. 6 and 7 are schematic diagrams of the first support frame under different view angles. The first support frame 109 comprises four gripping components 601 at the four corners. The first support frame 109 comprises a via 602 for the driving shaft 317 at its center. Each gripping component 601 extends from the first support frame 109 to the motor casing 310. Each gripping component 601 is shaped to contact the outer surface of the motor casing 310. The four gripping components 601 together surround and support the motor casing 310. Each gripping component 601 further comprises threaded holes 603 so that it can be screwed to the motor casing 310 with hexagon bolts. Compared to using supporting structures inside the motor casing 310 to connect the motor casing 310 with the first support frame, using the gripping components 601 to fix the motor casing 310 from outside makes it more convenient to assemble or disassemble the motor casing 310. The thickness of the first support frame 109 would also be reduced as a result so as to provide a compact structure of the winch. Any threaded connection on the interface between the first support frame 109 and motor casing 310 would possibly result in gaps that lead to inflow of water. The configuration of the gripping components 610 replaces the threaded connections to positions beyond that interface so that waterproof performances are improved.

The first support frame 109 further comprises a mounting pedestal 605 and a mounting groove 604 to mount the first motor end sealing ring 314 and the second motor end sealing ring 315 respectively. The shape of the first motor end sealing ring 314 corresponds to the cross-section of the coil casing 308. The shape of the second motor end sealing ring 315 corresponds to the cross-section of the motor casing 310. By providing two corresponding sealing rings to the coil casing 308 and the motor casing 310, the waterproof performances of the winch can be improved. Since the coil casing 308 is supported within the motor casing 310, the mounting grooves 604 surround the mounting pedestal 605.

Figure 8:
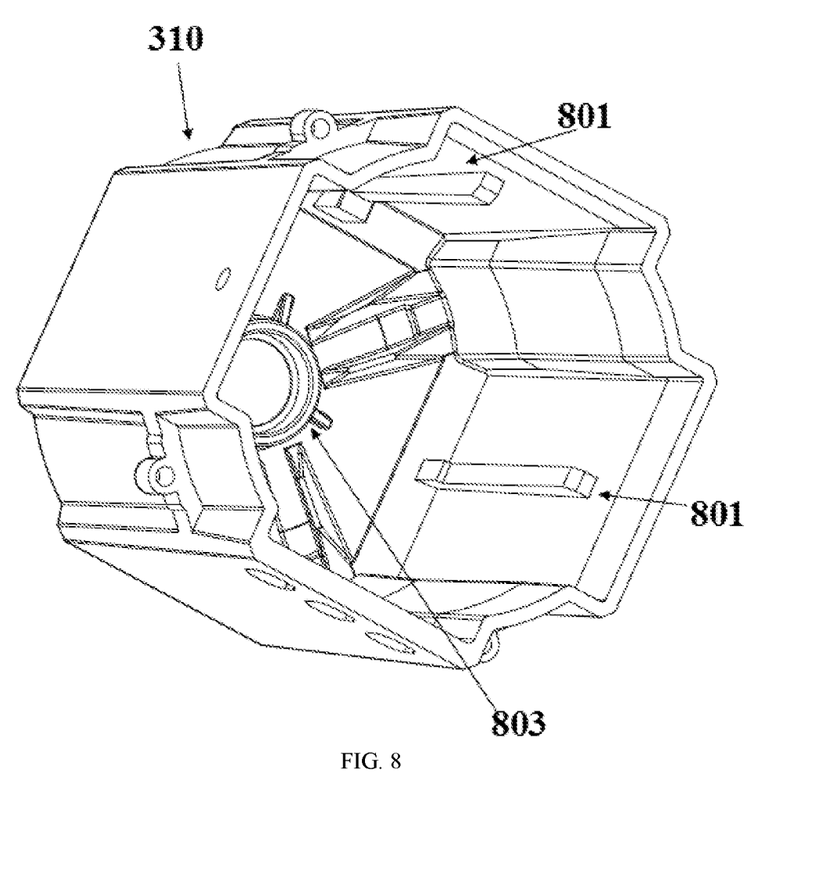
FIG. 8 is a schematic diagram of the inner structures of a motor casing of a winch according to an embodiment.

FIG. 8 shows the inner structures of the motor casing 310. A plurality of protruding support components 801 are comprised within the motor casing 310. The support components 801 are used to contact and support the coil casing 308. Each support component 801 is arranged on the side wall of the motor casing 310 and between two adjacent gripping components 601. Optionally, the support component 801 is located on the midpoint of the side wall. Therefore, two adjacent gripping components are symmetrically distributed with respect to a support component located between the two gripping components. Such a configuration of the gripping components 601 and the support components 801 reduces the space required by structures inside the motor casing 310 to support the coil casing 308 and connect to the first support frame 109. As a result, the size of the motor unit 107 of the winch can be reduced.

Although certain embodiments have been illustrated and described herein for purposes of description, a wide variety of alternate and/or equivalent embodiments or implementations to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof. Particular terms used herein when describing certain feature or aspects should not be taken to imply the terms are redefined to be restricted to any specific feature or aspects with which they are associated. In general, the terms used in the claims should not be construed to limit the invention to specific examples disclosed in the specification, unless the specification explicitly defines such terms. Accordingly, the actual scope of the invention encompasses not only the disclosed examples, but also all equivalent ways of practicing or implementing the invention under the claims.

What is claimed is:

1. A winch for vehicles, comprising:
   a motor;
   a motor casing covering at least a part of the motor;
   a driving shaft drivably connected to the motor,
   a gear reduction drivably connected to the driving shaft;
   a first support frame detachably connected to the motor casing;
   a second support frame detachably connected to the gear reduction unit; and
   a winding drum arranged between the first support frame and the second support frame, wherein
   the first support frame comprises a plurality of gripping components which extend from the first support frame to the motor casing and surround an outer surface of the motor casing,
   a via for receiving the driving shaft is arranged at the center of symmetry of the gripping components, and a brake component is installed within the via, and the brake component comprises a first torsion spring and a second torsion spring intertwined with each other.

2. The winch of claim 1, wherein the first support frame comprises a mounting groove for mounting a first sealing ring and a mounting pedestal surrounded by the mounting groove for mounting a second sealing ring.

3. The winch of claim 1, wherein each gripping components comprises a threaded hole, and the gripping components are screwed to the motor casing by a plurality of hexagon bolts.

4. The winch of claim 1, further comprising a control unit supported by the first and second support frames.

5. The winch of claim 4, wherein the motor casing comprises a plurality of conducting columns electrically coupled to the motor and the control unit, and the plurality of conducting columns protrude from the motor casing.

6. The winch of claim 5, wherein four protruding support components are arranged in the interior of the motor casing to contact and support a coil casing.

7. The winch of claim 6, wherein the plurality of gripping components comprise four gripping parts.

8. The winch of claim 1, wherein the winding drum is rotably connected to the motor and the gear reduction unit by the driving shaft.

* * * * *